United States Patent
Lagerwaard et al.

(10) Patent No.: US 11,154,069 B2
(45) Date of Patent: Oct. 26, 2021

(54) PROCESS FOR PREPARING FAT CONTINUOUS EMULSIONS CONTAINING PROTEIN

(71) Applicant: UPFIELD US INC., Englewood Cliffs, NJ (US)

(72) Inventors: Cornelis Abraham Lagerwaard, Hellevoetsluis (NL); Teunis de Man, Maassluis (NL); Frederik Michiel Meeuse, The Hague (NL)

(73) Assignee: UPFIELD EUROPE B.V., Rotterdam (NL)

( * ) Notice: Subject to any disclaimer, the term of this patent is extended or adjusted under 35 U.S.C. 154(b) by 290 days.

(21) Appl. No.: 15/776,516

(22) PCT Filed: Nov. 8, 2016

(86) PCT No.: PCT/EP2016/076915
§ 371 (c)(1),
(2) Date: May 16, 2018

(87) PCT Pub. No.: WO2017/084908
PCT Pub. Date: May 26, 2017

(65) Prior Publication Data
US 2018/0325136 A1    Nov. 15, 2018

(30) Foreign Application Priority Data
Nov. 20, 2015 (EP) .................................... 15195609

(51) Int. Cl.
*A23D 7/005* (2006.01)
*A23D 7/05* (2006.01)
*A23D 7/02* (2006.01)

(52) U.S. Cl.
CPC ............. *A23D 7/0056* (2013.01); *A23D 7/02* (2013.01); *A23D 7/05* (2013.01)

(58) Field of Classification Search
CPC ........... A23D 7/02; A23D 7/0056; A23D 7/05
See application file for complete search history.

(56) References Cited

U.S. PATENT DOCUMENTS

| | | | | |
|---|---|---|---|---|
| 1,006,418 | A * | 10/1911 | Wubbolts | E21B 3/06 74/665 H |
| 3,472,661 | A | 10/1969 | Melnick et al. | |
| 6,322,843 | B1 | 11/2001 | Schuurman et al. | |
| 8,043,648 | B2 * | 10/2011 | Edelman | A23D 7/0056 426/602 |
| 10,219,523 | B2 * | 3/2019 | Buter | A23D 7/04 |
| 10,470,476 | B2 * | 11/2019 | Balentine | A23D 7/04 |
| 10,582,719 | B2 * | 3/2020 | von Harras | A23L 9/22 |
| 10,750,579 | B2 * | 8/2020 | Okazaki | F03D 9/25 |
| 10,757,954 | B2 * | 9/2020 | Grebenkamper | A23L 33/115 |
| 2001/0016223 | A1 * | 8/2001 | Eendenburg Van | A23D 7/05 426/603 |
| 2003/0161935 | A1 | 8/2003 | Kakuda et al. | |
| 2007/0014911 | A1 * | 1/2007 | Huizinga | A23D 7/0056 426/602 |
| 2015/0327565 | A1 | 11/2015 | Aldred et al. | |

FOREIGN PATENT DOCUMENTS

| | | |
|---|---|---|
| EP | 2606753 | 6/2013 |
| EP | 2654443 | 1/2016 |
| GB | 1327511 | 8/1973 |
| WO | WO2005014158 | 2/2005 |
| WO | 2013149816 | * 10/2013 ............... A23D 7/04 |
| WO | WO2014005797 | 1/2014 |
| WO | WO2014117883 | 8/2014 |
| WO | WO2015052037 | 4/2015 |

OTHER PUBLICATIONS

Search Report & Written Opinion in EP15195612 dated Feb. 24, 2016; pp. 1 to 9.
RBD Coconut Oil; Elburg Global Technical Specifications; 2008; pp. 1-2; http://www. elburgglobal.nl, Apr. 4, 2015; XP055249893. pp. 10 to 11.
Search Report & Written Opinion in EP15195609 dated Feb. 24, 2016; pp. 12 to 18.
Search Report and Written Opinion in EP15195607 dated May 17, 2016; pp. 19 to 22.
Search Report and Written Opinion in PCTEP2016076921 dated Dec. 16, 2016; pp. 1 to 9.
Search Report and Written Opinion in PCTEP2016076573 dated Dec. 16, 2016; pp. 10 to 20.
Search Report and Written Opinion in PCTEP2016076919 dated Jan. 19, 2017; pp. 21 to 36.
Search Report and Written Opinion in PCTEP2016076915 dated Jan. 19, 2017; pp. 37 to 49.
Written Opinion 2 in PCTEP2016076915 dated Oct. 5, 2017; pp. 1 to 7.
IPRP2 in PCTEP2016076915 dated Mar. 5, 2018; pp. 8 to 20.
IPRP2 in PCTEP2016076919 dated Feb. 20, 2015; pp. 21 to 41.
Search Report and Written Opinion in EP15195619 dated May 3, 2016; pp. 42 to 46.
Written Opinion 2 in PCTEP2016076919 dated Oct. 13, 2017; pp. 47-53.
Co-pending Application: Applicant: de Man et al., Filed: May 16, 2018.

* cited by examiner

Primary Examiner — Amber R Orlando
Assistant Examiner — Philip A Dubois
(74) Attorney, Agent, or Firm — Arent Fox LLP

(57) ABSTRACT

A process for preparing a water-in-oil emulsion which emulsion comprises protein, oil and a hardstock fat. The process involves blending the melted hardstock fat with a water-continuous dispersion comprising protein and oil, wherein the temperature of the aqueous dispersion being mixed with the melted hardstock fat is below 15° C., and said mixing is carried out by a high shear mixing device followed by a pin-stirrer.

13 Claims, No Drawings

PROCESS FOR PREPARING FAT CONTINUOUS EMULSIONS CONTAINING PROTEIN

FIELD OF INVENTION

The present invention relates to a process for preparing fat-continuous emulsions (such as e.g. spreads and margarines) which emulsions comprise protein next to the fat components oil and hardstock fat.

BACKGROUND OF INVENTION

Edible water-in-oil emulsions, which comprise a continuous fat phase and a dispersed aqueous phase, are well known in the art and include for example margarine.

The fat phase of margarine and similar water-in-oil emulsions is typically a mixture of liquid oil (i.e. fat that is liquid at ambient temperature) and fat which is solid at ambient temperatures. The solid fat, also called structuring fat or hardstock fat, serves to structure the fat phase and helps to stabilize the aqueous phase (e.g. in the form of droplets) by forming a fat crystal network. Ideally the structuring fat has such properties that it melts or dissolves at mouth temperature otherwise the product may have a heavy and/or waxy mouthfeel.

Margarine is generally defined as a composition containing at least 80 wt. % fat and about 20 wt. % aqueous phase. In contrast, (spreadable) emulsions containing less than 80 wt. % fat are generally called spreads. Nowadays the terms margarine and spread are sometimes used interchangeably although in some countries the commercial use of the term margarine is subject to certain regulatory requirements.

In the market place margarine is generally sold as one of three principal types of water-in-oil emulsion:
 hard or stick margarine (also referred to as wrappers);
 (typically softer) tub margarine (typically named "spreads)"; and
 liquid or pourable margarine.

Wrapper margarines and tub margarines are non-pourable and generally contain a higher amount of hardstock fat than liquid or pourable margarines.

A component further present in many fat-continuous emulsions such as spreads and margarines is protein, such as the dairy proteins whey protein (e.g. in the form of milk powder, buttermilk powder or other). Such protein can be desired e.g. for taste reasons, and also it promotes emulsion-break-up in the mouth, thereby creating a favourable mouthfeel. The inclusion of protein in such composition brings about difficulties in manufacturing, as it may make it more difficult to create the stable water-in-oil emulsion. The latter brings about difficulties in the manufacture of fat-continuous emulsions that contain protein compared to formulations that do not contain (non-gelling-) protein. In other words: a process which works well for fat-continuous emulsions not containing protein may well fail to produce emulsions that do contain a non-gelling protein such as whey powder.

The general process for the manufacture of water-in-oil emulsions, using the votator or churn process, encompasses the following steps:
1. Mixing of the liquid oil, the hardstock fat and the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158. A disadvantage of such process is that it requires heating up and cooling the whole formulation, e.g. including all oil and all water. This costs a lot of energy. Melanges containing dairy fat next to vegetable fat as set out above can easily be made with such votator process, in which butter fat is melted and added to the total ingredient mix that is fed to the processing line. An example of such is the process of US 2003/161935. A modification of such can be found in US 2015/0327565 in e.g. example 4 and FIG. 2, in which only part (the pre-emulsion of the fat phase and aqueous phase) is subjected to two votator steps.

An alternative to the votator or churn process for the manufacture of margarines which is known involves the use of fat powder comprising hardstock fat (i.e. pre-crystallized fat) (WO 2005/014158). The fat powder used in such process is also known as ScMM powder (super critical melt micronisation) or PGSS process (particles from gas saturated solutions). Spreads can be made by blending at ambient or colder temperature liquid oil, the fat powder and an aqueous phase. This overcomes having to heat and cool the entire formulation. Disadvantages of such process relate e.g. to the need for equipment which is new in margarine and spreads making (pressurizing and handling $CO_2$, spraying melted fat, handling fat powder), capital expenditure. Also, the method proves to be less attractive for high-fat products (e.g. 70-85%).

A further alternative for making spreads is known e.g. from GB1327511. This reference discloses a process for the preparation of low-calorie spreads by mixing a first liquid (which is at a temperature of at least 28° C.) which consists of a fat phase containing crystallisable material with a second liquid (which is at a temperature of at most 8° C.) which is substantially free from crystallisable material. At least part of the second liquid is composed of the aqueous phase, and may further contain oils which are liquid at 2° C. The two liquids are fed separately to a high pressure dosing pump, allowing continuous dosing of the liquids.

There is a desire for a process that allows the manufacture of fat-continuous emulsions (e.g. spreads) comprising vegetable oil and hardstock, yet which also contains protein, and which process does not require heating up and cooling of the entire formulation, or almost entire formulation (for reasons of energy consumption) as is required for making such with the known votator process, and which process does not need complex equipment such as is e.g. needed for making the fat powder using the PGSS process.

SUMMARY OF THE INVENTION

It was found that these objectives can be met, at least in part, by a process for preparing a fat-continuous emulsion, which emulsion comprises 30-70% of an aqueous phase, said aqueous phase comprising 0.1-2% protein, by weight on total emulsion, and 30-70% of a fat phase, said fat phase comprising 5-80% hardstock (weight % on total fat phase), and 20-95% oil (weight % on total fat phase), which process comprises the steps of:

a. providing a water-continuous dispersion at a temperature of between 0° C. and 15° C. comprising water as a continuous phase with dispersed therein oil and further comprising protein, which water-continuous dispersion does not contain midstock fat fraction crystals;
b. providing the melted hardstock fat at a temperature of between 30° C. and 60° C.;
c. combining the water-continuous dispersion of step a. with the melted hardstock fat of step b.;
d. subjecting the mixture obtained after step c. to high shear imparted by a high shear device to provide a fat-continuous emulsion;
e. subject the emulsion obtained from step d. to working by a pin-stirrer; wherein the temperature of the mixture obtained from step c. is below the melting point of the hardstock fat.

DETAILED DESCRIPTION OF THE INVENTION

"Midstock" ("midstock" and "midstock fat" herein have the same meaning) is herein to be understood as any edible triglyceride fat or fraction which is solid when kept for 1 hour at 20° C., and which in the crystallisation speed test as described below gives less than 5% fat crystals by weight on the total fat fraction measured after 1 minute at 10° C.

"Hardstock" ("hardstock" and "hardstock fat" and "hardstock phase" herein have the same meaning) is herein to be understood as any edible triglyceride fat or fraction which is solid when kept for 1 hour at 20° C., and which in the crystallisation speed test as described below gives at least 5% or more fat crystals by weight on the total fat fraction measured after 1 minute at 10° C.

In the above definition, the crystallisation speed test is as follows:
  a 3 gram sample of the fat (hardstock or midstock) to be measured is heated to 80° C. in a glass NMR tube in an aluminium block kept in a thermostated water bath and kept there for at least 5 minutes;
  said sample is then cooled to 60° C., by putting the tube in an aluminum block kept in another thermostated water bath and kept there for at least 5 minutes;
  said sample is then quickly cooled to 10° C. (at which we set t=0), and kept at that temperature, by putting the tube in an aluminium block kept in another thermostated water bath and kept for 1 min residence time in the thermostatic block;
  during the keeping of the sample at 10° C. the amount of crystals formed in the fat (in weight %) is measured by NMR, at the regular time intervals, including at 1 minute after t=0 (i.e. at t=60 seconds).

In the above method, measurement of the amount of crystals formed can be done at other moments (different tubes, kept for e.g. 30 seconds, 2, 4, 8, 15 minutes etcetera) and with the resulting data an isothermal crystallisation graph can be prepared.

A hardstock phase can be a blend of midstock and hardstock still having the properties and specification of a hardstock. A hardstock or hardstock phase immediately forms solids upon cooling.

"Oil" is herein to be understood as an edible lipid material, at least 80% by weight being triglycerides of fatty acids, which edible lipid material is liquid at 20° C., and which is not hardstock or midstock.

In the process of the present invention, for ease of processing operation (e.g. equipment use) and efficiency, it is preferred that all of the aqueous phase and all of the oil phase of the final product are part of the water-continuous dispersion of step a.

In one embodiment, in the process of the invention the dispersion of step a. is obtained by mixing continuously in-line the aqueous continuous phase with the oil. Alternatively, the dispersion of step a. is preferably obtained by providing a stirred tank comprising the oil dispersed in the aqueous phase.

In the process according to the present invention, in order to be able to create a low temperature in which the hardstock fat can crystallise, it is preferred that the temperature of the aqueous dispersion in step a. is between 0 and 10° C.

The hardstock is added to the water-continuous dispersion in step c. in melted form. Thus, the temperature of the melted hardstock should be such that all the hardstock is melted, but preferably be as low as possible, as e.g. a hardstock at 90° C. would require too much cooling capacity from the aqueous phase to which it is added. Thus, in the present invention, for hardstock fats as are commonly used e.g. in spread manufacture, it is then usually preferred to that the temperature of the melted hardstock in step b. is between 30° C. and 55° C., more preferably between 35° C. and 50° C., even more preferably between 35° C. and 45° C.

In order to achieve the desired phase inversion (e.g. in step d.) of the aqueous dispersion into a fat-continuous emulsion with water droplets of the desired size and the formation of small crystals of hardstock that can stabilise such emulsion and that can give sufficient firmness to the product, the mixing of the combination of aqueous phase and oil with the melted hardstock should go in a swift way, and also the mixing operation should only result in a small temperature increase due to such high shear mixing. Regarding the latter, it is preferred that the high shear device results in a temperature increase of the emulsion of less than 5° C., more preferably a temperature increase of the emulsion of less than 3° C., when comparing temperature of the aqueous dispersion at the inlet and the temperature of the emulsion at the outlet of the high shear device. It was found that a high shear mixer having a rotor and a stator, which mixer has a residence time of less than 3 seconds, and sufficient shear to effect emulsification of water droplets in oil having a droplet size $d_{3,3}$ of less than 15 micrometer, can achieve such objectives. Hence, preferably the high shear device in step d. is such high shear mixer. A typical example of a mixer that can achieve the desired objectives is a fluid division mixer (FDM) as marketed by Maelstrom and as is described e.g. in EP1331988, in WO2002/38263, and in WO2013/037605.

In the process according to the present invention, the emulsion coming out of the high shear device is subjected to working by a pin stirrer. Pin stirrers in margarine processing are also known as C-units. Suitable pin stirrers are e.g. those having a residence time of between 15 seconds and 4 minutes, and a speed of between 50 and 300 rpm. With such pin stirrers tip speeds of between 0.5 and 6 m/s are preferred, more preferably between 1 and 4 m/s.

A convenient way to obtain hardstock fats is by a process which involves hardening of vegetable oils. Partial hardening may give beneficial properties with respect to melting behaviour and emulsion stablisation, yet such partial hardening may give rise to the formation of trans-unsaturated fatty acids in the triglycerides of the hardstock fat. Such trans-unsaturated fatty acids in the triglycerides ("trans-fats") are undesired from a health perspective. Hence, despite their beneficial structuring properties it is preferred that in the process according to the present invention the fat phase of the emulsion comprises less than 1% of trans-unsaturated fatty acids in the triglycerides, by weight on the total fat phase of the emulsion, more preferably the emulsion comprises less than 0.5% of trans-unsaturated fatty acids. Preferably, for reasons of consumer acceptance and the image of being all natural, the hardstock fat comprises at least 70% (more preferably at least 80%) of triglyceride esters of fatty acids (TAG's), by weight based on the total hardstock fat.

In the present emulsion, for reasons of balancing taste and mouthfeel with emulsion stabilisation, it is preferred that in the process for producing the emulsion the aqueous phase comprising 0.2-1.8% protein, by weight on total emulsion, more preferably 0.3 to 1%, by weight on total emulsion.

The protein included in the emulsion which is prepared by the process according to the present invention is preferably a non-gelling protein, as a non-gelling protein (such as dairy protein) may contribute to taste and mouthfeel, and gelling proteins such as gelatine usually do not. Gelling proteins are often included in low fat spreads for stability reasons, but such gelling proteins may negatively impact mouthfeel, and also some of them such as gelatine have a negative consumer image linked to e.g. BSE-disease. Thus, it is preferred that in the process according to the present invention, that the emulsion does not comprise a gelling protein. Preferably in the process of the present invention, the emulsion does not contain gelatine. For the reasons explained above, it is preferred that in the process according to the present invention, the protein in the emulsion is a non-gelling protein. A preferred protein in this context (e.g. for reasons of taste and consumer image) is a dairy protein, such as e.g. buttermilk protein or whey protein. Thus, in a preferred embodiment, in the process according to the present invention the protein in the emulsion is a non-gelling protein, and more preferably such non-gelling protein is a dairy protein. These proteins can be added e.g. as skim milk protein, buttermilk protein, skim milk non-fat, whey powder, or mixtures thereof.

Often, emulsions like are subject of the present invention contain a gelling biopolymer such as gelling carbohydrate (e.g. starch or a derivative thereof) for achieving increased stability. However, it is believed that the process according to the present invention does not need such gelling carbohydrate. Thus, for reasons of consumer preference and to have product label which is as clean as possible, it is preferred in the present invention that the emulsion in the process according to the present invention does not contain a gelling carbohydrate. Preferably the product produced by the present process does not contain starch or a starch-derivative.

Total desired fat levels of the emulsions made by the process according to the present emulsion are (for consumer preference) 40-80% fat, by weight based on the total product, more preferably such total fat levels are 45-65%.

To achieve a good balance between melting properties and stability, it is preferred that the weight ratio of oil: hardstock in the emulsion produced by the process according to the present invention is from 1:0.1 to 1:1. Even more preferably, in the emulsions made by the present process, the fat phase comprises 20-50% hardstock (weight % on total fat phase), and 50-80% oil (weight % on total fat phase), Although the process according to the present invention may yield liquid products or wrapper-type margarines, it is preferred that the fat continuous emulsion made by this process is a spreadable emulsion. A spreadable emulsion is an emulsion of the composition as described herein, which furthermore has a Stevens value of between 30 and 300 gram, when measured at 5° C.

EXAMPLES

Methods

Water Droplet Size Distribution of W/O Emulsions

The normal terminology for Nuclear Magnetic Resonance (NMR) is used throughout this method. On the basis of this method the parameters $d_{3,3}$ and $\exp(\sigma)$ of a lognormal water droplet size distribution can be determined. The $d_{3,3}$ is the volume weighted mean droplet diameter (in microns, in the present case) and $e^\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log—normal droplet size distribution—the parameters of the water droplet size distribution $d_{3,3}$ (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. Temperature of the sample: 5° C. (referred to as S5, unless measured at a different temperature, e.g. 20° C. for example 3, referred to as S20). The probe is pushed into the product at a speed of 2 mm/s, a trigger force of 5 gram from a distance of 10 mm. The force required is read from the digital display and is expressed in grams.

Example 1

A spreadable edible emulsion was prepared having the recipe as in Table 1.

TABLE 1

| Component | Amount (wt % on total) | Phase |
| --- | --- | --- |
| Rapeseed oil | 22.935 | dispersion phase |
| B-carotene (30%) | 0.138 | dispersion phase |
| Flavour | 0.008 | dispersion phase |
| Water | 37.6532 | dipsersion phase |
| Salt | 1.6 | dispersion phase |
| K-sorbate | 0.15 | dispersion phase |

TABLE 1-continued

| Component | Amount (wt % on total) | Phase |
|---|---|---|
| Skimmed Milk Powder | 0.5 | dispersion phase |
| NaCaEDTA | 0.0058 | dispersion phase |
| Lecithin | 0.1 | dispersion phase |
| Palm oil | 27.94 | Hardstock phase |
| dfPOs53 | 7.03 | Hardstock phase |
| POs58 | 1.24 | Hardstock phase |
| Lecithin | 0.1 | Hardstock phase |
| Mono, di-glycerides | 0.6 | Hardstock phase |

The composition was made by first preparing the dispersion phase (by blending all ingredients in the above table with the indication "dispersion phase") in a premix vessel. The aqueous phase so-prepared was kept at 6° C.

The hardstock phase was made by mixing all ingredients for this phase in a premix vessel. The hardstock phase was kept at 44° C.

The dispersion phase was then mixed with the hardstock phase. This was fed to a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). This operation was followed by subjecting the so-obtained composition to a 3 liter pin-stirrer operating at 100 rpm. The resulting product coming out of the high shear mixer had the appearance of a spread.

Comparative Example A

A second spreadable edible emulsion was prepared having the same recipe as Example 1. The processing was exactly the same as example 1, except that the last step (treatment with the pin-stirrer) after the high shear device was omitted.

Examples 2

A spreadable edible emulsion was prepared having the recipe as in Table 2.

TABLE 2

| Component | Amount (wt % on total) | Phase |
|---|---|---|
| Rapeseed oil | 22.935 | dispersion phase |
| B-carotene (30%) | 0.138 | dispersion phase |
| Flavour | 0.008 | dispersion phase |
| Water | 37.6532 | dispersion phase |
| Salt | 1.6 | dispersion phase |
| K-sorbate | 0.15 | dispersion phase |
| Skimmed Milk Powder | 0.5 | dispersion phase |
| NaCaEDTA | 0.0058 | dispersion phase |
| Lecithin | 0.1 | disperison phase |
| Palm oil | 31 | Hardstock phase |
| POs58 | 5 | Hardstock phase |
| Lecithin | 0.1 | Hardstock phase |
| Mono, di-glycerides | 0.6 | Hardstock phase |

The composition was made by first preparing the dispersion phase in a premix vessel. The aqueous phase so-prepared was kept at 6° C.

The hardstock phase was made by mixing all ingredients for this phase in a premix vessel. The hardstock phase was kept at 44° C.

The dispersion phase was then mixed with the hardstock phase. This was fed to a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). This operation was followed by subjecting the so-obtained composition to a 3 liter pin-stirrer operating at 100 rpm. The resulting product coming out of the high shear mixer had the appearance of a spread.

Comparative Example B

A second spreadable edible emulsion was prepared having the same recipe as Example 2. The processing was exactly the same as example 2, except that the last step (treatment with the pin-stirrer) after the high shear device was omitted.

Results

| process | Example 1 FDM + C | Comparative A FDM | Example 2 FDM + C | Comparative B FDM |
|---|---|---|---|---|
| $d_{3,3}$ after 1 week storage at 20° C. | 6.5 | 14.6 | 5.1 | 12.4 |
| $e^\sigma$ | 2.3 | 4.6 | 1.3 | 2.9 |
| $d_{3,3}$ after 1 week storage at 35° C. | 9.7 | 15.0 | Nm | Nm |
| $e^\sigma$ | 2.0 | 4.3 | Nm | Nm |
| Stevens value at 5° C. | 175 | 178 | 249 | 245 |

-continued

| process | Example 1 FDM + C | Comparative A FDM | Example 2 FDM + C | Comparative B FDM |
|---|---|---|---|---|
| $d_{3,3}$ after 1 week storage at 40° C. | Nm | Nm | 6.6 | 27.1 |
| $e^\sigma$ | nm | Nm | 1.9 | 3.5 |

All products with $d_{3,3}$ below 10 have an acceptable quality.

The invention claimed is:

1. A process for preparing a fat-continuous emulsion, which emulsion comprises 30-70% of an aqueous phase, said aqueous phase comprising 0.1-2% protein, by weight of the total emulsion, and 30-70% of a fat phase, said fat phase comprising 5-80% hardstock, and 20-95% oil by weight of the total fat phase, wherein the process comprises the steps of:
   a) providing a water-continuous dispersion at a temperature of between 0° C. and 15° C. comprising water as a continuous phase with dispersed therein oil and further comprising protein, wherein the water-continuous dispersion does not contain midstock fat fraction crystals;
   b) providing the melted hardstock fat at a temperature of between 30° C. and 60° C.;
   c) combining the water-continuous dispersion of step a) with the melted hardstock fat of step b);
   d) subjecting the mixture obtained after step c) to high shear imparted by a high shear device to provide a fat-continuous emulsion, wherein the high shear device is a high shear mixing process in a high shear mixer having a rotor and a stator, and wherein the mixer has a residence time of less than 3 seconds, and sufficient shear to effect emulsification of water droplets in oil having a droplet size d3,3 of less than 15 micrometer; and
   e) subjecting the emulsion obtained from step d) to working by a pin-stirrer;
   wherein the temperature of the mixture obtained from step c. is below the melting point of the hardstock fat.

2. The process of claim 1, wherein all of the aqueous phase and all of the oil phase of the final product are part of the water-continuous dispersion of step a).

3. The process of claim 1, wherein the dispersion of step a) is obtained by mixing continuously in-line the aqueous continuous phase with the oil.

4. The process of claim 1, wherein the dispersion of step a) is obtained by providing a stirred tank comprising the oil dispersed in the aqueous phase.

5. The process of claim 1, wherein the temperature of the aqueous dispersion in step a) is between 0 and 10° C.

6. The process of claim 1, wherein the temperature of the melted hardstock in step b) is between 30 and 55° C.

7. The process of claim 1, wherein the residence time of the emulsion in the pin stirrer in step e) is between 15 seconds and 4 minutes, and wherein the stirrer in the pin stirrer has a rotation speed of between 50 and 300 rpm.

8. The process of claim 1, wherein the fat phase comprises less than 1% of trans-unsaturated fatty acids, by weight of the total fat phase of the emulsion.

9. The process of claim 1, wherein the protein is a non-gelling protein.

10. The process of claim 9, wherein the non-gelling protein is a dairy protein.

11. The process of claim 1, wherein the emulsion does not contain a gelling protein or a gelling carbohydrate.

12. The process of claim 1, wherein the fat continuous emulsion is a spreadable emulsion.

13. The process of claim 1, wherein the temperature of the melted hardstock in step b) is between 35° C. and 45° C.

* * * * *